(12) United States Patent
Nakada et al.

(10) Patent No.: US 10,196,950 B2
(45) Date of Patent: Feb. 5, 2019

(54) EXHAUST PURIFICATION SYSTEM AND CATALYST REGENERATION METHOD

(71) Applicant: ISUZU MOTORS LIMITED, Tokyo (JP)

(72) Inventors: Teruo Nakada, Yokohama (JP);
Takayuki Sakamoto, Fujisawa (JP);
Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/557,075

(22) PCT Filed: Feb. 26, 2016

(86) PCT No.: PCT/JP2016/055929
§ 371 (c)(1),
(2) Date: Sep. 8, 2017

(87) PCT Pub. No.: WO2016/143564
PCT Pub. Date: Sep. 15, 2016

(65) Prior Publication Data
US 2018/0066556 A1    Mar. 8, 2018

(30) Foreign Application Priority Data
Mar. 9, 2015   (JP) ................. 2015-045609

(51) Int. Cl.
*F01N 3/20* (2006.01)
*F01N 3/36* (2006.01)
(Continued)

(52) U.S. Cl.
CPC .............. *F01N 3/20* (2013.01); *B01D 53/94* (2013.01); *B01D 53/96* (2013.01); *F01N 3/08* (2013.01);
(Continued)

(58) Field of Classification Search
CPC ........... B01D 53/94; B01D 53/96; F01N 3/08; F01N 3/0814; F01N 3/0842; F01N 3/20;
(Continued)

(56) References Cited

U.S. PATENT DOCUMENTS

2003/0051464 A1    3/2003  Wachi et al.
2016/0201587 A1    7/2016  Nagaoka et al.

FOREIGN PATENT DOCUMENTS

DE      19636790 A1    3/1998
EP        829623 A1    3/1998
(Continued)

OTHER PUBLICATIONS

International Search Report and Written Opinion for PCT App No. PCT/JP2016/055929 dated Apr. 12, 2016, 9 pgs.
(Continued)

*Primary Examiner* — Brandon Lee
(74) *Attorney, Agent, or Firm* — Procopio, Cory, Hargreaves & Savitch LLP (57) ABSTRACT

Provided is an exhaust purification system including: an NOx occlusion reduction type catalyst (32), a catalyst temperature estimating unit (115), an NOx occlusion amount estimating unit (113), a regeneration control unit (100) that performs catalyst regeneration of bringing an exhaust gas into a rich state to recover NOx occlusion capacity of the NOx occlusion reduction type catalyst (32), an interval setting unit (118) that sets a target interval from the termination of the catalyst regeneration to a start of next catalyst regeneration, a catalyst regeneration start processing unit (110) that starts the next catalyst regeneration when the NOx occlusion amount is equal to or greater than a threshold and an elapsed time from the termination of the catalyst regeneration reaches the target interval, and an interval target value correcting unit (119) that extends and corrects the
(Continued)

target interval based on the NOx occlusion amount when the catalyst temperature is lower than a predetermined catalyst activation temperature.

4 Claims, 10 Drawing Sheets

(51) Int. Cl.
 *B01D 53/94* (2006.01)
 *B01D 53/96* (2006.01)
 *F01N 3/08* (2006.01)
 *F02D 41/04* (2006.01)
 *F02D 45/00* (2006.01)

(52) U.S. Cl.
 CPC ......... *F01N 3/0814* (2013.01); *F01N 3/0842* (2013.01); *F01N 3/36* (2013.01); *F02D 41/04* (2013.01); *F02D 45/00* (2013.01); *F01N 2260/04* (2013.01); *F01N 2430/06* (2013.01); *F01N 2570/14* (2013.01); *F01N 2900/1602* (2013.01); *F01N 2900/1614* (2013.01)

(58) Field of Classification Search
 CPC .... F01N 3/36; F01N 2260/04; F01N 2430/06; F01N 2570/14; F01N 2900/1602; F01N 2900/1614; F02D 41/04; F02D 45/00
 See application file for complete search history.

(56) References Cited

FOREIGN PATENT DOCUMENTS

| | | |
|---|---|---|
| EP | 3054120 A1 | 8/2016 |
| FR | 2878900 A1 | 6/2006 |
| JP | H11-270382 A | 10/1999 |
| JP | 2000-230421 A | 8/2000 |
| JP | 2003-090246 A | 3/2003 |
| JP | 2005127288 A | 5/2005 |
| JP | 2006-336518 A | 12/2006 |
| JP | 2008-202425 A | 9/2008 |
| JP | 2014-125975 A | 7/2014 |
| JP | 2015-068268 A | 4/2015 |

OTHER PUBLICATIONS

Extended European Search Report for related EP App No: 16761535.0 dated Oct. 8, 2018, 7 pgs.

EXHAUST PURIFICATION SYSTEM AND CATALYST REGENERATION METHOD

CROSS-REFERENCE TO RELATED APPLICATIONS

This application is a U.S. National Stage entry of PCT Application No. PCT/JP/2016/055929, filed on Feb. 26, 2016, which claims priority to Japanese Patent Application No. 2015-045609, filed Mar. 9, 2015, the contents of which are incorporated herein by reference.

TECHNICAL FIELD

The present invention relates to an exhaust purification system and a catalyst regeneration method.

BACKGROUND ART

In the related art, an NOx occlusion reduction type catalyst is known as a catalyst which reduces and purifies a nitrogen compound (NOx) in an exhaust gas discharged from an internal combustion engine. When the exhaust gas is under a lean atmosphere, the NOx occlusion reduction type catalyst occludes the NOx contained in the exhaust gas. When the exhaust gas is under a rich atmosphere, the NOx occlusion reduction type catalyst detoxifies the occluded NOx through reducing and purifying with hydrocarbon contained in the exhaust gas, and discharges the NOx. For this reason, in a case where the NOx occlusion amount of the catalyst reaches a predetermined amount, in order to recover NOx occlusion capacity, it is necessary to regularly perform the so-called NOx purge which makes the exhaust gas be in a rich state by a post injection or an exhaust pipe injection (for example, see JP-A-2008-202425).

On the other hand, a technique is proposed in an exhaust post-treatment device of a diesel engine which suppresses deterioration of an NOx purification rate even when a load variation arises immediately after the start of rich-spike treatment (for example, see JP-A-2014-125975).

A technique is proposed In the exhaust purification system that determines a deterioration state of an NOx purification catalyst from a detection value of an oxygen concentration sensor without using an NOx concentration sensor, thereby precisely setting a lean period until the start of the next regeneration control and preventing the decrease of the NOx purification rate (for example, see JP-A-2006-336518).

SUMMARY OF THE INVENTION

Technical Problem

Meanwhile, when the NOx occlusion amount of an NOx occlusion reduction type catalyst is equal to or greater than a predetermined upper limit threshold, it is possible to early get out of the state where an NOx purification rate is lowered, by frequently performing the NOx purge in a short period of time. However, if such control is performed in a state where the catalyst temperature is lower than an activation temperature, there is a problem that occurrence of white smoke and deterioration of fuel consumption are caused by excess supply of unburned fuel.

The exhaust purification system and the catalyst regeneration method of the present invention are to effectively prevent the occurrence of white smoke and the deterioration of fuel consumption by appropriately correcting an interval of NOx purification according to the amount of NOx occlusion when a catalyst is in an inactive state.

Solution to Problem

An exhaust purification system according to the present disclosure includes: an NOx occlusion reduction type catalyst that is provided in an exhaust passage of an internal combustion engine to purify a nitrogen compound in an exhaust gas; a temperature acquiring unit that acquires a catalyst temperature of the NOx occlusion reduction type catalyst; an NOx occlusion amount estimating unit that estimates an NOx occlusion amount of the occlusion reduction type catalyst; a catalyst regeneration unit that performs a catalyst regeneration process of bringing an exhaust gas into a rich state to recover NOx occlusion capacity of the NOx occlusion reduction type catalyst; a target interval setting unit that sets a target interval from the termination of the catalyst regeneration process by the catalyst regeneration unit to a start of a next catalyst regeneration process; a catalyst regeneration start processing unit that causes the catalyst regeneration unit to start the next catalyst regeneration process when the NOx occlusion amount estimated by the NOx occlusion amount estimating unit is equal to or greater than a predetermined threshold and an elapsed time from the termination of the catalyst regeneration process by the catalyst regeneration unit reaches the target interval; and a target interval correcting unit that extends and corrects the target interval based on the NOx occlusion amount estimated by the NOx occlusion amount estimating unit when the catalyst temperature acquired by the temperature acquiring unit is lower than a predetermined catalyst activation temperature.

In addition, an exhaust purification system according to the present disclosure includes: an NOx occlusion reduction type catalyst that is disposed in an exhaust passage of an internal combustion engine to occlude and reduce a nitrogen compound contained in an exhaust gas discharged from the internal combustion engine; a control unit that controls an air-fuel ratio of the exhaust gas discharged from the internal combustion engine, wherein the control unit operates to execute a series of process including:

a catalyst temperature acquiring process of acquiring a catalyst temperature of the NOx occlusion reduction type catalyst;

an NOx occlusion amount estimating process of estimating an NOx occlusion amount of the occlusion reduction type catalyst;

a catalyst regeneration process of bringing an exhaust gas into a rich state to recover NOx occlusion capacity of the NOx occlusion reduction type catalyst;

a target interval setting process of setting a target interval from the termination of the previous catalyst regeneration process to a start of a next catalyst regeneration process;

a catalyst regeneration start process of starting the next catalyst regeneration process when the NOx occlusion amount estimated by the NOx occlusion amount estimating process is equal to or greater than a threshold and an elapsed time from the termination of the previous catalyst regeneration process reaches the target interval; and a target interval correcting process of extending and correcting the target interval based on the NOx occlusion amount estimated by the NOx occlusion amount estimating process when the catalyst temperature acquired by the catalyst temperature acquiring process is lower than a catalyst activation temperature.

In an exhaust purification system including an NOx occlusion reduction type catalyst that is disposed in an exhaust passage of an internal combustion engine, and occludes and reduce a nitrogen compound contained an exhaust gas discharged from the internal combustion engine, a catalyst regeneration method according to the present disclosure includes: a catalyst temperature acquiring process of acquiring a catalyst temperature of the NOx occlusion reduction type catalyst; an NOx occlusion amount estimating process of estimating an NOx occlusion amount of the occlusion reduction type catalyst; a catalyst regeneration process of bringing an exhaust gas into a rich state to recover NOx occlusion capacity of the NOx occlusion reduction type catalyst; a target interval setting process of setting a target interval from the termination of the previous catalyst regeneration process to a start of a next catalyst regeneration process; a catalyst regeneration start process of starting the next catalyst regeneration process when the NOx occlusion amount estimated by the NOx occlusion amount estimating process is equal to or greater than a threshold and an elapsed time from the termination of the previous catalyst regeneration process reaches the target interval; and a target interval correcting process of extending and correcting the target interval based on the NOx occlusion amount estimated by the NOx occlusion amount estimating process when the catalyst temperature acquired by the catalyst temperature acquiring process is lower than a catalyst activation temperature.

Advantageous Effects of the Invention

The exhaust purification system and the catalyst regeneration method of the present disclosure can effectively prevent occurrence of white smoke and deterioration of fuel consumption by appropriately correcting an interval of NOx purification according to the amount of NOx occlusion when the catalyst is in an inactive state.

DESCRIPTION OF EMBODIMENTS

Hereinafter, an exhaust purification system according to one embodiment of the present invention will be described based on accompanying drawings.

Figure 1:
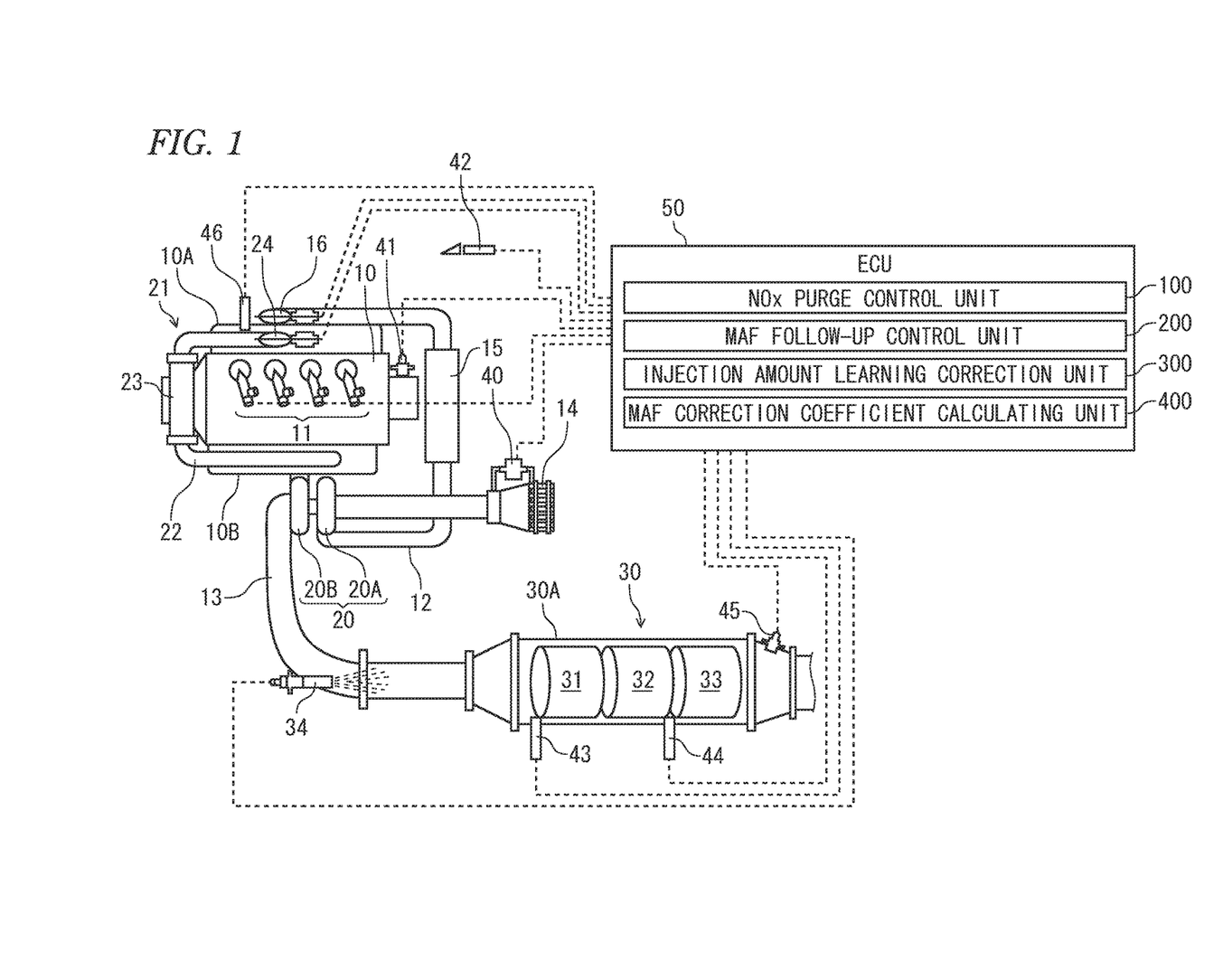
FIG. 1 is an entire configuration diagram illustrating an exhaust purification system according to an embodiment.

As illustrated in FIG. 1, an injector 11 which directly injects high pressure fuel accumulated in a common rail (not illustrated) into a cylinder is provided in each of cylinders of a diesel engine (hereinafter, simply referred to as an engine) 10. The fuel injection amount or the fuel injection timing of the injector 11 is controlled in response to an instruction signal input from an electronic control unit (hereinafter, referred to as ECU) 50.

An intake manifold 10A of the engine 10 is connected with an intake passage 12 which introduces fresh air therein, and an exhaust manifold 10B is connected with an exhaust passage 13 which derives an exhaust gas outside. An air cleaner 14, an intake air amount sensor (hereinafter, referred to as a MAF sensor) 40, a compressor 20A of a variable capacity supercharger 20, an intercooler 15, an intake throttle valve 16, and the like are provided in order from an intake upstream side in the intake passage 12. A turbine 20B of the variable capacity supercharger 20, an exhaust post-treatment device 30, and the like are provided in order from an exhaust upstream side in the exhaust passage 13. The engine 10 is attached with an engine speed sensor 41, an accelerator opening sensor 42, and a boost pressure sensor 46.

In the description of the embodiment, a MAF sensor 40 for measuring and detecting the mass air flow is used as the intake air amount sensor for measuring and detecting the intake air amount (suction air flow) of the engine, but a different type of air flow sensor from the MAF sensor 40 or a unit substituted for the air flow sensor may be used as long as it can measure and detect the suction air flow of the engine.

An EGR (Exhaust Gas Recirculation) device 21 includes an EGR passage 22 which connects the exhaust manifold 10B and the intake manifold 10A, an EGR cooler 23 which cools an EGR gas, and an EGR valve 24 which adjusts an EGR amount.

The exhaust post-treatment device 30 is configured such that an oxidation catalyst 31, an NOx occlusion reduction type catalyst 32, and a particulate filter (hereinafter, simply referred to as a filter) 33 are disposed in order from the exhaust upstream side in a case 30A. An exhaust pipe injection device 34 which injects an unburned fuel (mainly, hydrocarbon (HC)) into the exhaust passage 13 in response to the instruction signal input from an ECU 50 is provided in the exhaust passage 13 on the upstream side from the oxidation catalyst 31.

For example, the oxidation catalyst 31 is formed by carrying an oxidation catalyst component on a ceramic carrier surface such as a honeycomb structure. When an unburned fuel is supplied by the post injection of the exhaust pipe injection device 34 or the injector 11, the oxidation catalyst 31 oxidizes the unburned fuel to raise the exhaust temperature.

For example, the NOx occlusion reduction type catalyst 32 is formed by carrying an alkali metal and the like on a ceramic carrier surface such as a honeycomb structure. The NOx occlusion reduction type catalyst 32 occludes NOx in the exhaust gas when an exhaust air fuel ratio is in a lean state, and reduces and purifies the occluded NOx by a reducing agent (HC and the like) contained in the exhaust gas when the exhaust air fuel ratio is in a rich state.

For example, the filter 33 is formed such that a plurality of cells sectioned by porous partition walls are disposed in a flowing direction of the exhaust gas, and the upstream side and the downstream side of the cells are sealed alternately. In the filter 33, PM in the exhaust gas is collected in a pore or a surface of the partition wall, and when the estimation amount of PM deposition reaches a predetermined amount, the so-called filter-forced regeneration is performed which combusts and removes the PM. The filter-forced regeneration is performed in such a manner that the unburned fuel is supplied to the oxidation catalyst 31 on the upstream side by an exhaust pipe injection or the post injection, and the temperature of the exhaust gas flowing in the filter 33 is raised to a PM combusting temperature.

A first exhaust temperature sensor 43 is provided on the upstream side from the oxidation catalyst 31, and detects the temperature of the exhaust gas flowing in the oxidation catalyst 31. A second exhaust temperature sensor 44 is provided between the NOx occlusion reduction type catalyst 32 and the filter 33, and detects the temperature of the exhaust gas flowing in the filter 33. An NOx/lambda sensor 45 is provided on the downstream side from the filter 33, and detects an NOx value and a lambda value of the exhaust gas passing through the NOx occlusion reduction type catalyst 32 (hereinafter, referred to as an excess air ratio).

The ECU 50 performs various controls on the engine 10 and the like, and includes a well-known CPU or a ROM, a RAM, an input port, an output port, and the like. In order to perform the various controls, the sensor values of the sensors 40 to 46 are input to the ECU 50. The ECU 50 includes an NOx purge control unit 100, a MAF follow-up control unit 200, an injection amount learning correction unit 300, and a MAF correction coefficient calculating unit 400 as partial functional elements. In description, such functional elements are included in the ECU 50 which is an integral hardware. However, any part thereof may be provided in a separate hardware.

<NOx Purge Control>

Figure 2:
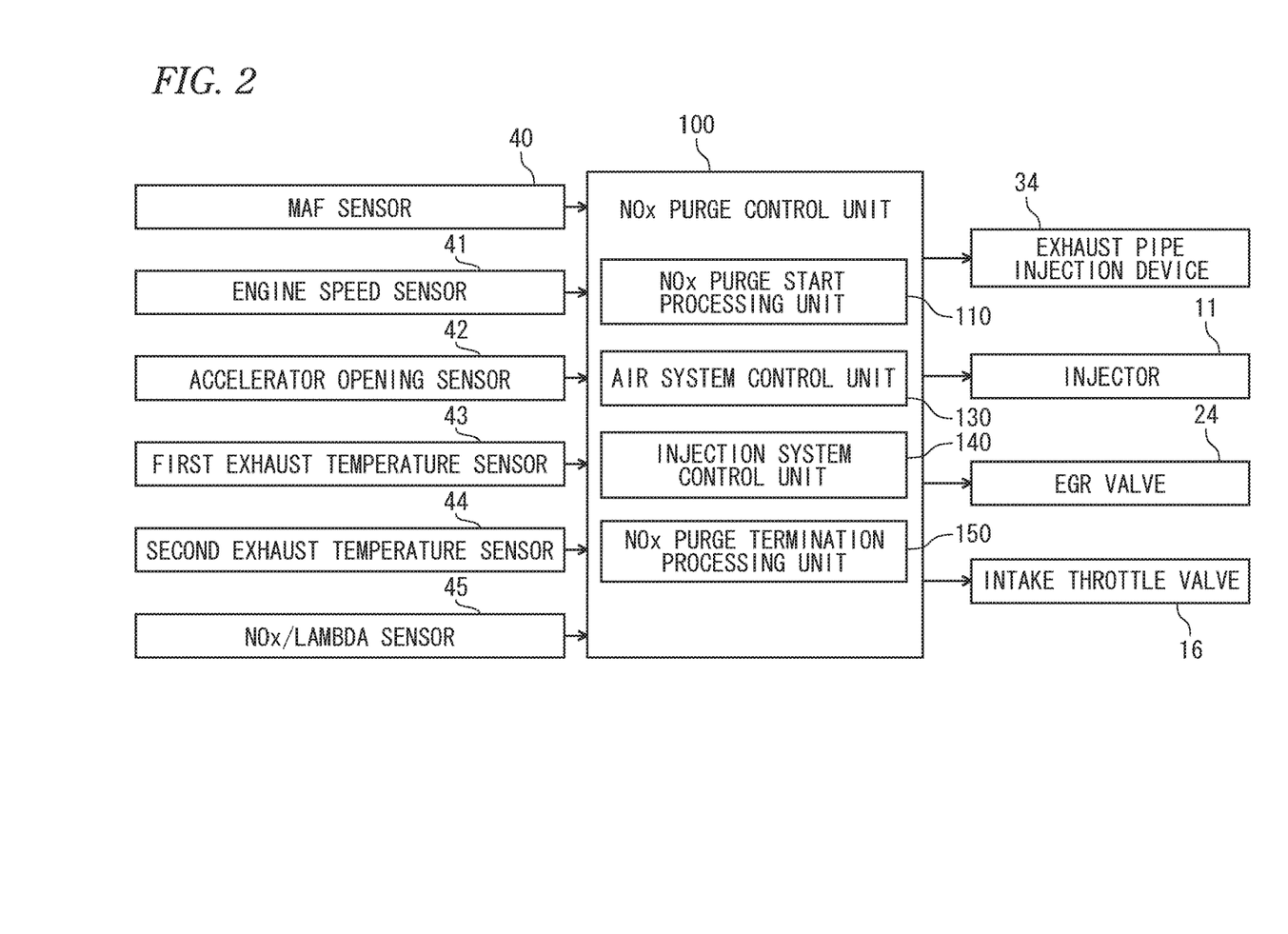
FIG. 2 is a functional block diagram illustrating an NOx purge control unit according to the embodiment.

The NOx purge control unit 100 is an example of the catalyst regeneration unit of the present disclosure, and executes a regeneration processing control (hereinafter, referred to as an NOx purge control) that recovers the NOx occlusion capacity of the NOx occlusion reduction type catalyst 32 by detoxifying the NOx, which is occluded in the NOx occlusion reduction type catalyst 32 when the exhaust gas is under a rich atmosphere, by reduction purification, and then discharging the NOx. In the embodiment, as illustrated in FIG. 2, the NOx purge control unit 100 includes an NOx purge start processing unit 110, an air system control unit 130, an injection system control unit 140, and NOx purge termination processing unit 150, as parts of functional components. Hereinafter, details of each of these functional components will be described.

[Start Process of NOx Purge Control]

Figure 4:
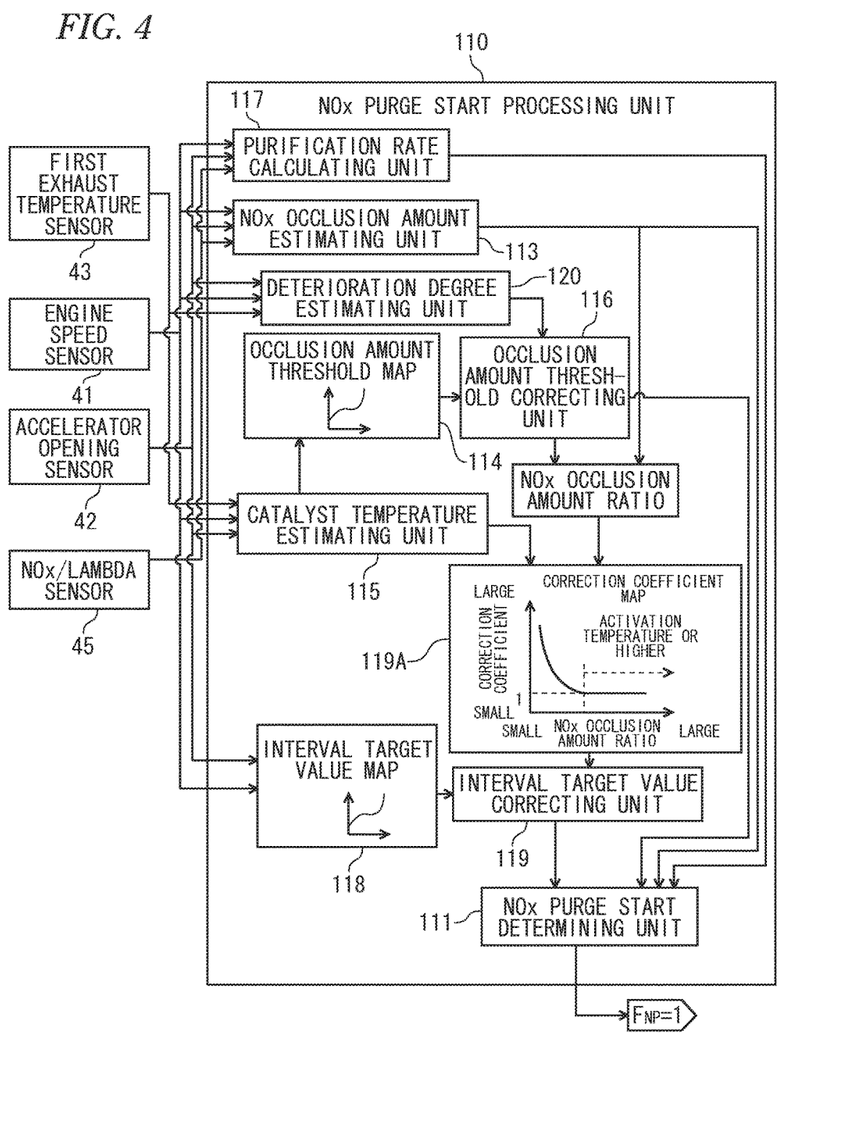
FIG. 4 is a block diagram illustrating a start process of an NOx purge according to the embodiment.

FIG. 4 is a block diagram illustrating a start process to be executed by the NOx purge start processing unit 110.

An NOx purge start determining unit 111 starts the NOx purge control by turning on ($F_{NP}=1$) (see time $t_1$ in FIG. 3) the NOx purge flag $F_{NP}$ when the following conditions are established: an NOx purge start request satisfying any one of (1) a first condition that an NOx occlusion amount estimation value $m\_{NOx}$ of the NOx occlusion reduction type catalyst 32 is equal to or greater than a predetermined NOx occlusion amount threshold $STR\_{thr\_NOx}$ and (2) a second condition that the NOx purification rate $Pur\_{NOx}$ % of the NOx occlusion reduction type catalyst 32 is lowered to a predetermined purification rate threshold $Pur\_{thr\_NOx}$ % and (3) a third condition that an elapsed time $Int\_{Time}$ measured from the end of the previous NOx purge control by a timer built in the ECU reaches a predetermined interval target value $Int\_{tgr}$.

The NOx occlusion amount estimation value $m\_{NOx}$ used for the determination of the first condition is estimated by the NOx occlusion amount estimating unit 113. The NOx occlusion amount estimation value $m\_{NOx}$ may be calculated based on a map or a model equation including an operating state of the engine 10 or a sensor value of the NOx/lambda sensor 45 as an input signal, for example. The NOx occlusion amount threshold $STR\_{thr\_NOx}$ is set by an occlusion amount threshold map 114 referred to based on a catalyst estimation temperature $Temp\_{LNT}$ of the NOx occlusion reduction type catalyst 32. The catalyst estimation temperature $Temp\_{LNT}$ is estimated by the catalyst temperature estimating unit 115. The catalyst estimation temperature $Temp\_{LNT}$ may be estimated based on an inlet temperature of the oxidation catalyst 31 detected by the first exhaust temperature sensor 43, an HC/CO calorific value inside the oxidation catalyst 31 and the NOx occlusion reduction type catalyst 32, and the amount of heat radiated to the outside air, for example. The NOx occlusion amount threshold $STR\_{thr\_NOx}$ set based on the occlusion amount threshold map 114 is adapted to be corrected by an occlusion amount threshold correcting unit 116 which will be described in detail below.

The NOx purification rate $NOx\_{pur}$ % used for the determination of the second condition is calculated by a purification rate calculating unit 117. The NOx purification rate $NOx\_{pur}$ % may be obtained by dividing the NOx amount on the catalyst downstream side detected by the NOx/lambda sensor 45 by the NOx discharging amount on the catalyst upstream side estimated from the operating state of the engine 10, for example.

The interval target value $Int\_{tgr}$ used for the determination of the third condition is set by an interval target value map 118 referred to based on the engine speed Ne and the accelerator opening Q. The interval target value $Int\_{tgr}$ is adapted to be corrected by an interval target value correcting unit 119 which will be described in detail below.

The interval target value $Int\_{tgr}$ is an example of a target interval of the present disclosure.

[Correction of Occlusion Amount Threshold]

The NOx occlusion capacity of the NOx occlusion reduction type catalyst 32 decreases with progresses of aged deterioration, heat deterioration, and the like. Therefore, when the NOx occlusion amount threshold $NOx\_{thr\_val}$ is set to a fixed value, there is a possibility that the execution frequency of NOx purge according to the aged deterioration, the heat deterioration, and the like cannot be ensured, resulting in causing deterioration of exhaust emission.

In order to prevent such deterioration of the exhaust emission, the occlusion amount threshold correcting unit 116 executes decrease correction to decrease the NOx occlusion amount threshold $NOx\_{thr\_val}$, which is set by the occlusion amount threshold map 114, with the increase in the degree of deterioration of the NOx occlusion reduction type catalyst 32.

More specifically, the decrease correction is performed by multiplying the NOx occlusion amount threshold $NOx\_{thr\_val}$ by a deterioration correction coefficient (deterioration degree) obtained by a deterioration degree estimating unit 120. The deterioration correction coefficient may be obtained based on, for example, the lowering of HC/CO calorific value inside the NOx occlusion reduction type catalyst 32, thermal history of the NOx occlusion reduction type catalyst 32, the lowering of the NOx purification rate in the NOx occlusion reduction type catalyst 32, and a vehicle traveling distance.

[Correction of Interval Target Value]

When the NOx occlusion amount of the NOx occlusion reduction type catalyst 32 is equal to or greater than the NOx occlusion amount threshold $NOx\_{thr\_val}$, it is possible to early get out of the state where the NOx purification rate is lowered, by frequently performing the NOx purge in a short period of time. However, if such control is performed in a state where the catalyst temperature is lower than an activation temperature, there is a problem that occurrence of white smoke and deterioration of fuel consumption are caused by excess supply of unburned fuel.

In order to prevent the occurrence of white smoke and the deterioration of fuel consumption, the interval target value correcting unit 119 executes interval correction to correct the interval target value $Int\_{tgr}$ set by the interval target value map 118 according to a "catalyst temperature" and an "NOx occlusion amount ratio" when the NOx purge start request (first and second conditions described above) is established. The interval correction will be described in detail below.

The interval correction coefficient map 119A is a map referred to based on the NOx occlusion amount ratio obtained by dividing the NOx occlusion amount estimation value $m\_{NOx}$ by the NOx occlusion amount threshold $NOx\_{thr\_val}$ ($=m\_{NOx}/NOx\_{thr\_val}$) and the catalyst temperature of the NOx occlusion reduction type catalyst 32, and the relation between the NOx occlusion amount ratio or the catalyst temperature and the correction coefficient $Int\_{Corr}$ by which the interval target value $Int\_{tgr}$ is multiplied.

More specifically, when the catalyst estimation temperature $Temp\_{LNT}$ input from the catalyst temperature estimating unit 115 is lower than a predetermined catalyst activation temperature, the correction coefficient $Int\_{Corr}$ is larger than "1", and is set as a correction coefficient that makes the interval target value $Int\_{tgr}$ longer as the NOx occlusion amount ratio becomes smaller. That is, in a state where the catalyst temperature of the NOx occlusion reduction type catalyst 32 is lower than the activation temperature, an extension period of the interval target value $Int\_{tgr}$ is set to be long when the NOx occlusion amount is small, and the extension period of the interval target value $Int\_{tgr}$ is set to be short when the NOx occlusion amount is large.

On the other hand, when the catalyst estimation temperature $Temp\_{LNT}$ input from the catalyst temperature estimating unit 115 is equal to or higher than the catalyst activation temperature, the correction coefficient $Int\_{Corr}$ is set to "1". That is, when the catalyst temperature of the NOx occlusion reduction type catalyst 32 is equal to or higher than the activation temperature, the interval target value $Int\_{tgr}$ set by the interval target value map 118 is transmitted to the NOx purge start determining unit 111 without the interval correction.

In the embodiment, as described above, when the NOx purge start request is established, if the catalyst temperature is lower than the activation temperature, the interval target value Int_tgr is corrected to extend according to the NOx occlusion amount ratio. This is makes it possible to reliably prevent the NOx purge from being frequently performed in the catalyst inactivation state and effectively suppress the occurrence of white smoke and the deterioration of fuel consumption.

<Termination Process of NOx Purge Control>

Figure 5:
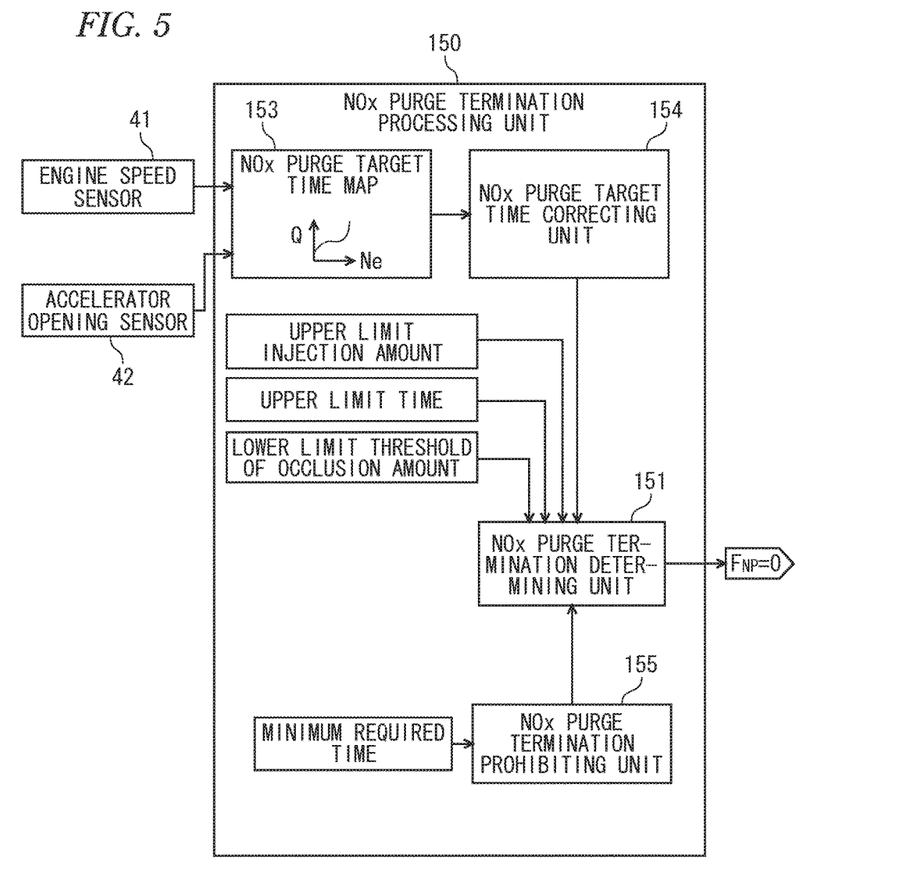
FIG. 5 is a block diagram illustrating a termination process of the NOx purge according to the embodiment.

FIG. 5 is a block diagram illustrating a termination process to be processed by the NOx purge termination processing unit 150. An NOx purge termination determining unit 151 terminates the NOx purge control by turning off ($F_{NP}$=0) (see time $t_1$ in FIG. 3) the NOx purge flag $F_{NP}$ when any one of the following conditions are established: (1) a first termination condition that the NOx occlusion amount estimation value $m\_{NOx}$ calculated by the NOx occlusion amount estimating unit 113 (see FIG. 4) is lowered to a predetermined lower limit threshold of the occlusion amount; (2) a second termination condition that the total injection amount of exhaust pipe injection or post injection accumulated from the start of the NOx purge control reaches a predetermined upper limit injection amount, (3) a third termination condition that the elapsed time measured from the start of the NOx purge control reaches a predetermined upper limit time, and (4) a fourth termination condition that the elapsed time measured from the start of the NOx purge control by the timer reaches a predetermined NOx purge target time $NP\_{Time\_trg}$.

The NOx purge target time $NP\_{Time\_trg}$ used for the determination of the fourth termination condition is set by an NOx purge target time map 153 referred to based on the engine speed Ne and the accelerator opening Q. The NOx purge target time $NP\_{Time\_trg}$ is corrected by an NOx purge target time correcting unit 154 which will be described in detail below.

An NOx purge termination prohibiting unit 155 prohibits the NOx purge termination determining unit 152 from terminating the NOx purge control until an elapsed time measured from the start of the NOx purge control reaches a predetermined minimum required time. The minimum required time is set to be longer than the time at which the control operation by an air system control or a MAF follow-up control to be described below is completed, and to be shorter than the upper limit time used for the determination of the above termination condition (3).

In the embodiment, as described above, even when the termination conditions (1) to (4) are established, the NOx purge control is continuously executed until the elapsed time from the start of the NOx purge control reaches the minimum required time. This makes it possible to reliably prevent erroneous operation or the like caused by the stop of various control operations such as the air system control, the injection system control, and the MAF follow-up control started for the NOx purge in an incomplete state.

<Correction of NOx Purge Target Time>

Since the NOx occlusion capacity of the NOx occlusion reduction type catalyst 32 decreases with the progress of aged deterioration, heat deterioration, or the like, unless the deterioration degree of the catalyst is reflected in the NOx purge target time $NP\_{Time\_trg}$, the fuel may be excessively supplied, and a phenomenon in which hydrocarbon (HC) passes through the catalyst and is discharged, so-called HC slip may occur.

In order to prevent the HC slip, the NOx purge target time correcting unit 154 executes shortening correction to shorten the NOx purge target time $NP\_{Time\_trg}$ set by the NOx purge target time map 153 as the deterioration degree of the NOx occlusion reduction type catalyst 32 increases. More specifically, the shortening correction is performed by multiplying the NOx purge target time $NP\_{Time\_trg}$ by a deterioration correction coefficient obtained by the deterioration degree estimating unit 120 (see FIG. 4).

<NOx Purge Lean Control>

When the NOx purge flag $F_{NP}$ is turned on, the air system control unit 130 executes the NOx purge lean control that lowers the excess air ratio from a steady operating state (for example, about 1.5) to a first target excess air ratio (for example, about 1.3) on a lean side from a value equivalent to a theoretical air-fuel ratio (about 1.0). Hereinafter, a detail description will be given about the NOx purge lean control and the NOx purge rich control.

Figure 6:
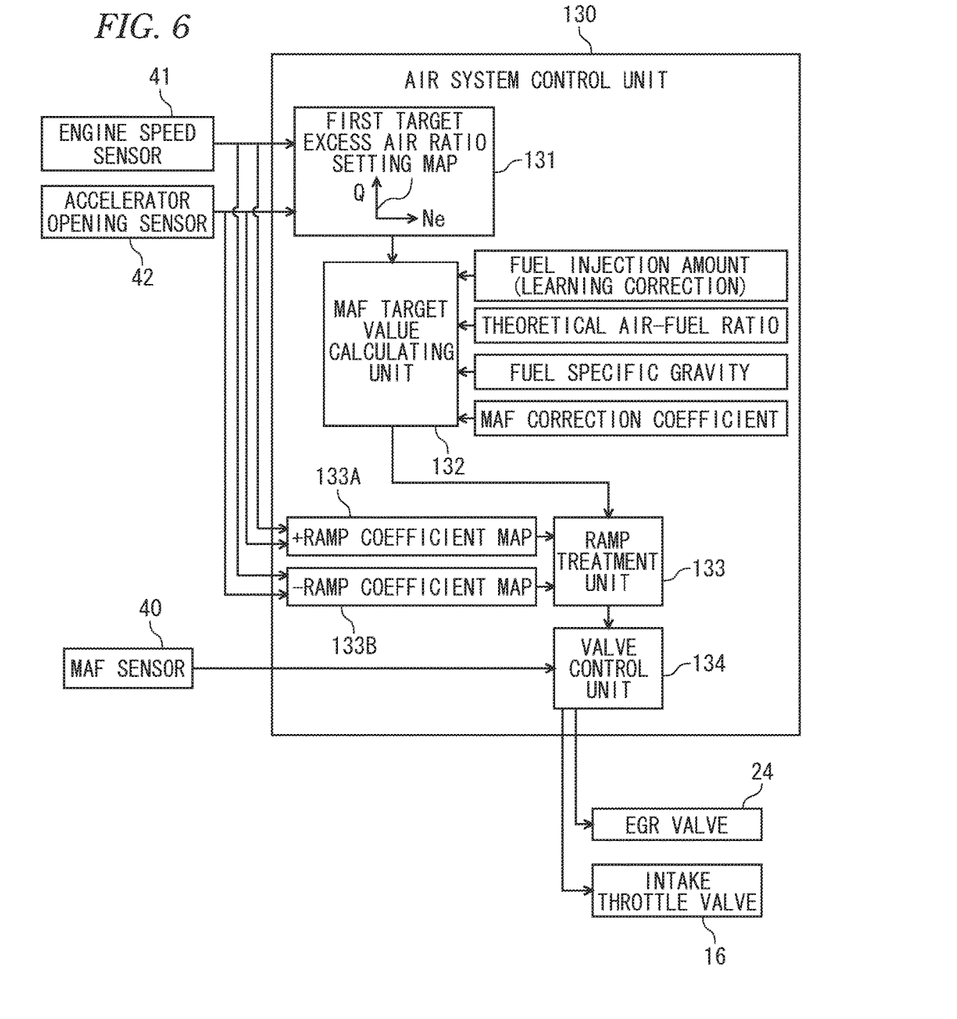
FIG. 6 is a block diagram illustrating a setting process of a MAF target value at the time of an NOx purge lean control according to the embodiment.

FIG. 6 is a block diagram illustrating a setting process of the MAF target value $MAF_{NPL\_Trgt}$ at the time of the NOx purge lean control. The first target excess air ratio setting map 131 is a map based on the engine speed Ne and the accelerator opening Q. The excess air ratio target value $\lambda_{NPL\_Trgt}$ (first target excess air ratio) at the time of the NOx purge lean control corresponding to the engine speed Ne and the accelerator opening Q is set based on an experiment and the like in advance.

First, the excess air ratio target value $\lambda_{NPL\_Trgt}$ at the time of the NOx purge lean control is read from the first target excess air ratio setting map 131 using the engine speed Ne and the accelerator opening Q as input signals, and is input to the MAF target value calculating unit 132. In addition, in the MAF target value calculating unit 132, the MAF target value $MAF_{NPL\_Trgt}$ at time of the NOx purge lean control is calculated based on the following Equation (1).

$$MAF_{NPL\_Trgt} = \lambda_{NPL\_Trgt} \times Q_{fnl\_corrd} \times Ro_{Fuel} \times AFR_{sto} / Maf\_corr \quad (1)$$

In Equation (1), $Q_{fnl\_corrd}$ indicates a learning-corrected (to be described later) fuel injection amount (excluding the post injection), $Ro_{Fuel}$ indicates a fuel specific gravity. $AFR_{sto}$ indicates a theoretical air-fuel ratio, and Maf_corr indicates a MAF correction coefficient (to be described later).

Figure 3:
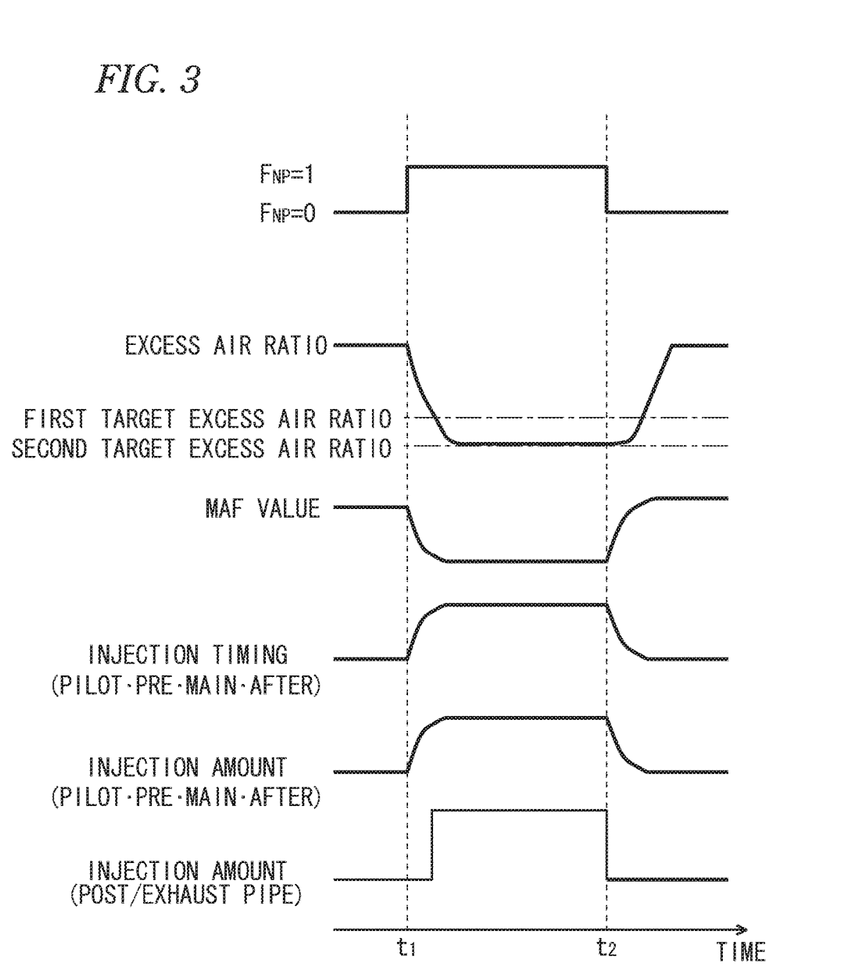
FIG. 3 is a timing chart for describing an NOx purge control according to the embodiment.

The MAF target value $MAF_{NPL\_Trgt}$ calculated by the MAF target value calculating unit 132 is input to a ramp treatment unit 133 when the NOx purge flag $F_{NP}$ is turned on (see time $t_1$ of FIG. 3). The ramp treatment unit 133 reads a ramp coefficient from a plus ramp coefficient map 133A and a minus ramp coefficient 133B using the engine speed Ne and the accelerator opening Q as input signals, and inputs a MAF target ramp value $MAF_{NPL\_Trgt\_Ramp}$, in which the ramp coefficient is added, to a valve control unit 134.

The valve control unit 134 executes a feedback control that throttles the intake throttle valve 16 to the shutting side and opens the EGR valve 24 to the open side such that the actual MAF value $MAF_{Act}$ input from the MAF sensor 40 becomes the MAF target ramp value $MAF_{NPL\_Trg\_Ramp}$.

In this manner, in the embodiment, the MAF target value $MAF_{NPL\_Trgt}$ is set based on the excess air ratio target value $\lambda_{NPL\_Trgt}$ read from the first target excess air ratio setting map 131 and the fuel injection amount of the injector 11, and an air system operation is feedback-controlled based on the MAF target value $MAF_{NPL\_Trgt}$. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge lean control.

When the fuel injection amount $Q_{fnl\_corrd}$ after the learning correction is used as the fuel injection amount of the injector 11, the MAF target value $MAF_{NPL\_Trgt}$ can be set by a feed-forward control to effectively exclude influence such as the aged deterioration, the property change, or the like of the injector 11.

When the ramp coefficient set in response to the operating state of the engine 10 is added to the MAF target value $MAF_{NPL\_Trgt}$, the deterioration of the drivability and the like caused by the misfire or the torque fluctuation of the engine 10 due to the rapid change of the intake air amount can be effectively prevented.

<Fuel Injection Amount Setting of NOx Purge Rich Control>

The injection system control unit 140 executes the NOx purge rich control that lowers the excess air ratio from the first target excess air ratio to the second target excess air ratio on a rich side (for example, about 0.9) when the NOx purge flag $F_{NP}$ is turned on. Hereinafter, a detail description will be given about the SOx purge lean control and the SOx purge rich control.

Figure 7:
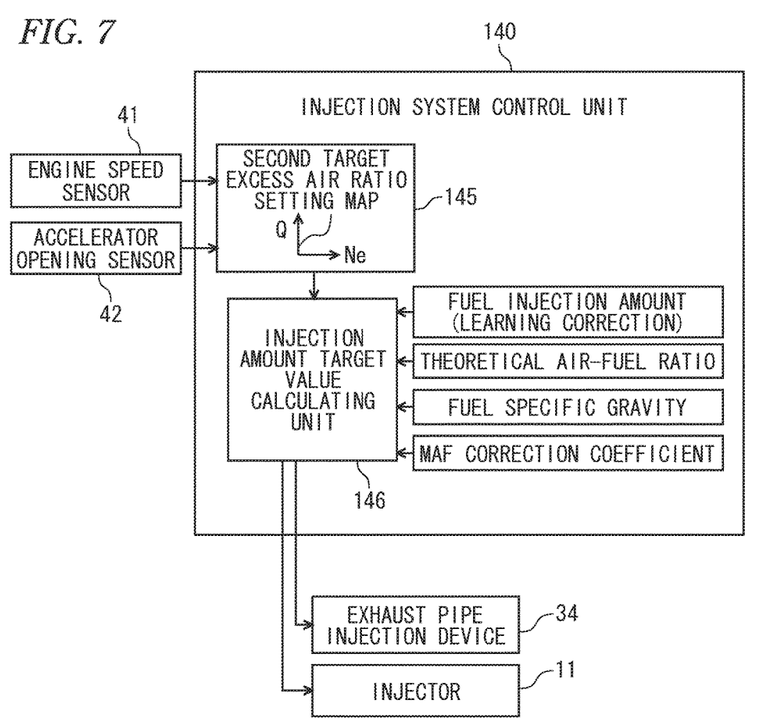
FIG. 7 is a block diagram illustrating a setting process of a target injection amount at the time of an NOx purge rich control according to the embodiment.

FIG. 4 is a block diagram illustrating a setting process of the target injection amount $Q_{NPR\_Trgt}$ (injection amount per unit of time) of the exhaust pipe injection or the post injection in the NOx purge rich control. A second target excess air ratio setting map 145 is a map based on the engine speed Ne and the accelerator opening Q. The excess air ratio target value $\lambda_{NPR\_Trgt}$ (second target excess air ratio) at the time of the NOx purge rich control corresponding to the engine speed Ne and the accelerator opening Q is set based on an experiment and the like in advance.

First, the excess air ratio target value $\lambda_{NPR\_Trgt}$ at the time of the NOx purge rich control is read from the second target excess air ratio setting map 145 using the engine speed Ne and the accelerator opening Q as input signals, and is input to an injection amount target value calculating unit 146. In addition, in the injection amount target value calculating unit 146, the target injection amount $Q_{NPR\_Trgt}$ at the time of the NOx purge rich control is calculated based on the following Equation (2).

$$Q_{NPR\_Trgt} = MAF_{NPL\_Trgt} \times Maf\_corr/(\lambda_{NPR\_Target} \times Ro_{Fuel} \times AFR_{sto}) - Q_{fnl\_corrd} \quad (2)$$

In Equation (2), $MAF_{NPL\_Trgt}$ is a MAF target value at the time of a lean NOx purge, and is input from the above-described MAF target value calculating unit 72. $Q_{fnl\_corrd}$ indicates a learning-corrected (to be described later) fuel injection amount (excluding the post injection) before a MAF follow-up control is applied thereto, $Ro_{Fuel}$ indicates a fuel specific gravity, and $AFR_{sto}$ indicates a theoretical air-fuel ratio, and Maf_corr indicates a MAF correction coefficient (to be described later).

When the NOx purge flag $F_{NP}$ is turned on, the target injection amount $Q_{NPR\_Trgt}$ calculated by the injection amount target value calculating unit 146 is transmitted as the injection instruction signal to the exhaust pipe injection device 33 or the injector 11 (time $t_1$ of FIG. 3). The transmission of the injection instruction signal is continued until the NOx purge flag $F_{NP}$ is turned off (time $t_2$ of FIG. 3) by the termination determination of the NOx purge control (to be described later).

In this manner, in the embodiment, the target injection amount $Q_{NPR\_Trgt}$ is set based on the excess air ratio target value $\lambda_{NPR\_Trgt}$ read from the second target excess air ratio setting map 145 and the fuel injection amount of the injector 11. Accordingly, without providing the lambda sensor on the upstream side of the NOx occlusion reduction type catalyst 32, or without using a sensor value of the lambda sensor although the lambda sensor is provided on the upstream side of the NOx occlusion reduction type catalyst 32, the exhaust gas can be effectively lowered to the desired excess air ratio required for the NOx purge rich control.

When the fuel injection amount $Q_{fnl\_corrd}$ after the learning correction is used as the fuel injection amount of the injector 11, the target injection amount $Q_{NPR\_Trgt}$ can be set by the feed-forward control to effectively exclude influence such as the aged deterioration, the property change, or the like of the injector 11.

<MAF Follow-up Control>

In (1) a time of switching from the lean state of a regular operation to the rich state through the NOx purge control, and (2) a time of switching the rich state to the lean state of the regular operation through the NOx purge control, the MAF follow-up control unit 80 executes a control to correct the fuel injection timing and the fuel injection amount of each injector 11 in response to a MAF change (MAF follow-up control).

<Injection Amount Learning Correction>

Figure 8:
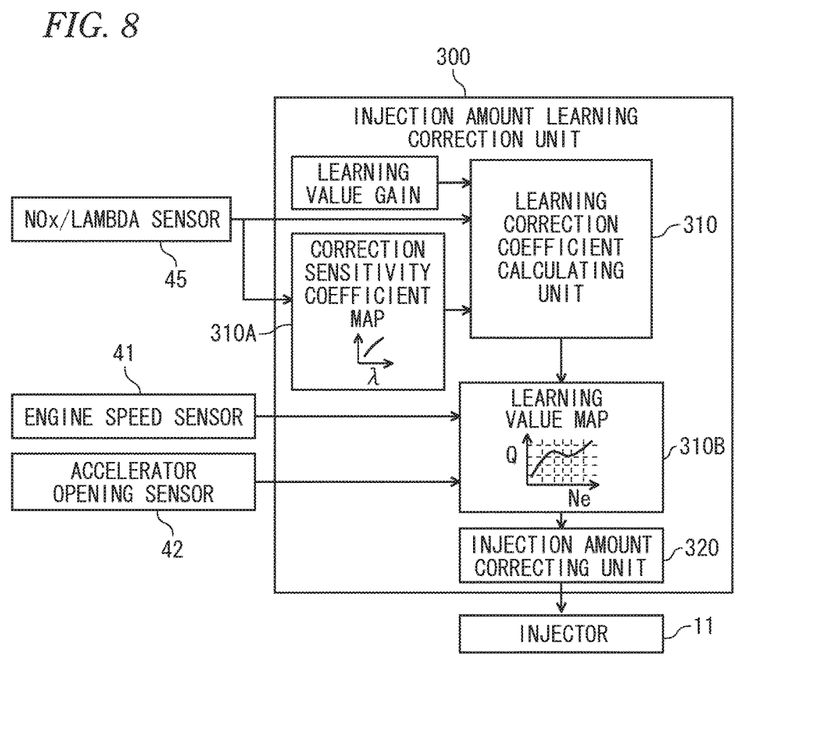
FIG. 8 is a block diagram illustrating a process of an injection amount learning correction of an injector according to the embodiment.

As illustrated in FIG. 8, the injection amount learning correction unit 300 includes a learning correction coefficient calculating unit 310 and an injection amount correcting unit 320.

The learning correction coefficient calculating unit 310 calculates a learning correction coefficient $F_{Corr}$ of the fuel injection amount based on an error $\Delta\lambda$ between an actual lambda value $\lambda_{Act}$ detected by the NOx/lambda sensor 45 at the time of a lean operation of the engine 10 and an estimated lambda value $\lambda_{Est}$. When the exhaust gas is in the lean state, the HC concentration in the exhaust gas is very low, so that the change in the exhaust lambda value due to the oxidation reaction of HC in the oxidation catalyst 31 is negligibly small. For this reason, it is considered that the actual lambda value $\lambda_{Act}$ in the exhaust gas which passes through the oxidation catalyst 31 and is detected by the NOx/lambda sensor 45 on the downstream side matches with the estimated lambda value $\lambda_{Est}$ in the exhaust gas discharged from the engine 10. For this reason, in a case where the error $\Delta\lambda$ occurs between the actual lambda value $\lambda_{Act}$ and the estimated lambda value $\lambda_{Est}$, the error can be assumed to result from a difference between an instructed injection amount and an actual injection amount in the injector 11. Hereinafter, the calculation process of the learning correction coefficient performed by the learning correction coefficient calculating unit 310 using the error $\Delta\lambda$ will be described based on the flow of FIG. 9.

Figure 9:
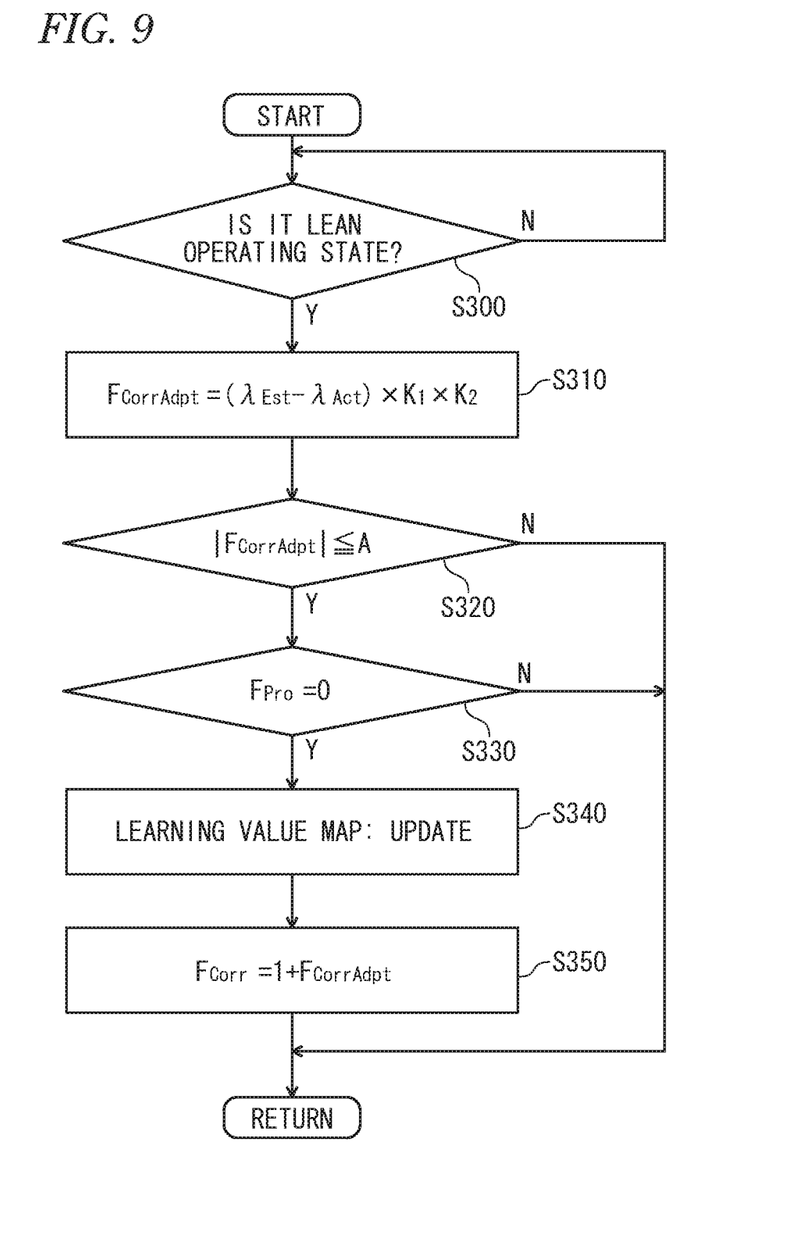
FIG. 9 is a flow diagram for describing a calculation process of a learning correction coefficient according to the embodiment.

In Step S300, it is determined based on the engine speed Ne and the accelerator opening Q whether the engine 10 is in a lean operating state. If the engine 10 is in the lean operating state, the procedure proceeds to Step S310 in order to start the calculation of the learning correction coefficient.

In Step S310, a learning value $F_{CorrAdpt}$ is calculated by multiplying the error $\Delta\lambda$ obtained by subtracting the actual lambda value $\lambda_{Act}$ detected by the NOx/lambda sensor 45 from the estimated lambda value $\lambda_{Est}$ by a learning value gain $K_1$ and a correction sensitivity coefficient $K_2$ ($F_{CorrAdpt}=(\lambda_{Est}-\lambda_{Act})\times K_1\times K_2$). The estimated lambda value $\lambda_{Est}$ is estimated and calculated from the operating state of the engine 10 depending on the engine speed Ne or the accelerator opening Q. The correction sensitivity coefficient $K_2$ is read from a correction sensitivity coefficient map 310A illustrated in FIG. 8 using the actual lambda value $\lambda_{Act}$ detected by the NOx/lambda sensor 45 as an input signal.

In Step S320, it is determined whether an absolute value $|F_{CorrAdpt}|$ of the learning value $F_{CorrAdpt}$ is in a range of a predetermined correction limit value A. In a case where the absolute value $|F_{CorrAdpt}|$ exceeds the correction limit value A, this control returns to stop the present learning.

In Step S330, it is determined whether a learning prohibition flag $F_{Pro}$ is turned off. The learning prohibition flag $F_{Pro}$ corresponds, for example, to the time of a transient operation of the engine 10, the time of the NOx purge control ($F_{NP}=1$), and the like. It is because in a state where such a condition is satisfied, the error $\Delta\lambda$ becomes larger according to the change of the actual lambda value $\lambda_{Act}$ so that the learning is not executed exactly. As for whether the engine 10 is in a transient operating state, for example, based on the time change amount of the actual lambda value $\lambda_{Act}$ detected by the NOx/lambda sensor 45, a case where the time change amount is larger than the predetermined threshold may be determined as the transient operating state.

In Step S340, a learning value map 310B (see FIG. 8) based on the engine speed Ne and the accelerator opening Q is renewed to the learning value $F_{CorrAdpt}$ calculated in Step S310. More specifically, a plurality of learning areas sectioned in response to the engine speed Ne and the accelerator opening Q are set on the learning value map 310B. Preferably, such learning areas are set such that the range thereof is narrower as the area is used more frequently, and the range thereof is wider as the area is used less frequently. Accordingly, in the frequently used area, a learning accuracy can be improved, and in the less-frequently used area, non-learning can be effectively prevented.

In Step S350, the learning correction coefficient $F_{Corr}$ is calculated by adding "1" to the learning value read from the learning value map 310B using the engine speed Ne and the accelerator opening Q as input signals ($F_{Corr}=1+F_{CorrAdpt}$). The learning correction coefficient $F_{Corr}$ is input to the injection amount correcting unit 320 illustrated in FIG. 8.

The injection amount correcting unit 320 executes the correction of the fuel injection amount by multiplying respective basic injection amounts of a pilot injection $Q_{Pilot}$, a pre-injection $Q_{Pre}$, a main injection $Q_{Main}$, an after injection $Q_{After}$, and a post injection $Q_{Post}$ by the learning correction coefficient $F_{Corr}$.

In this manner, a variation such as the aged deterioration, the property change, or the individual difference of the injectors 11 can be effectively excluded by correcting the fuel injection amount of the injector 11 with the learning value according to the error $\Delta\lambda$ between the estimated lambda value $\Delta_{Est}$ and the actual lambda value $\lambda_{Act}$.

<MAF Correction Coefficient>

Figure 10:
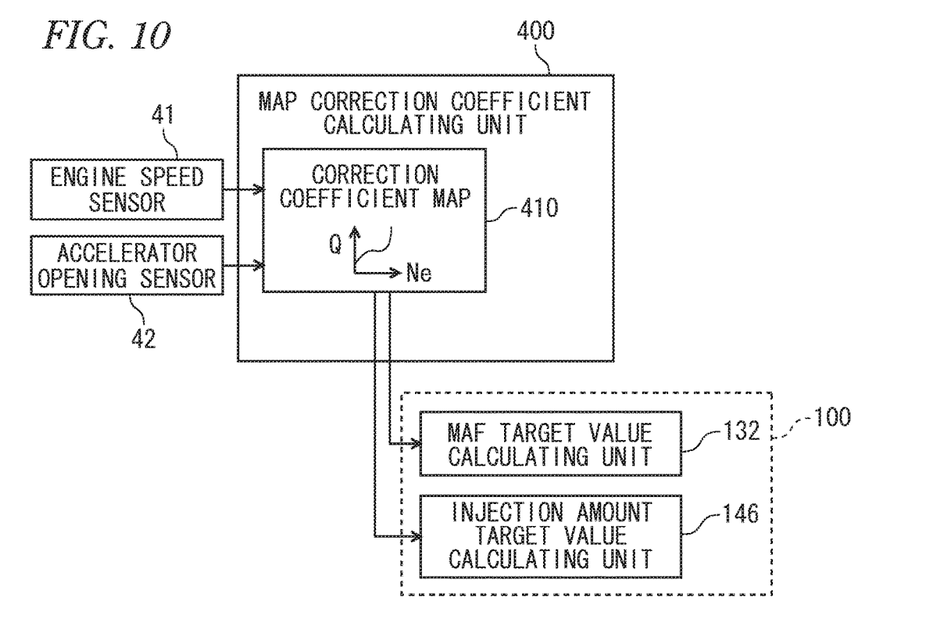
FIG. 10 is a block diagram illustrating a setting process of a MAF correction coefficient according to the embodiment.

The MAF correction coefficient calculating unit 400 calculates a MAF correction coefficient Maf_corr used to set the MAF target value $MAF_{NPL\_Trgt}$ or the target injection amount $Q_{NPR\_Trgt}$ at the time of the NOx purge control.

In the embodiment, the fuel injection amount of the injector 11 is corrected based on the error $\Delta\lambda$ between the actual lambda value $\lambda_{Act}$ detected by the NOx/lambda sensor 45 and the estimated lambda value $\lambda_{Est}$. However, since the lambda is a ratio of air and fuel, a factor of the error $\Delta\lambda$ is not necessarily limited to the effect of the difference between the instructed injection amount and the actual injection amount in the injector 11. That is, the error $\Delta\lambda$ of the lambda may be affected by an error of the MAF sensor 40 as well as that of the injector 11.

FIG. 10 is a block diagram illustrating a setting process of the MAF correction coefficient Maf_corr performed by the MAF correction coefficient calculating unit 400. A correction coefficient setting map 410 is a map based on the engine speed Ne and the accelerator opening Q, and the MAF correction coefficient Maf_corr indicating the sensor property of the MAF sensor 40 corresponding to the engine speed Ne and the accelerator opening Q is set based on an experiment and the like in advance.

The MAF correction coefficient calculating unit 400 reads the MAF correction coefficient Maf_corr from the correction coefficient setting map 410 using the engine speed Ne and the accelerator opening Q as input signals, and transmits the MAF correction coefficient Maf_corr to the MAF target value calculating unit 132 and the injection amount target value calculating unit 146. Accordingly, the sensor property of the MAF sensor 40 can be effectively reflected to set the MAF target value $MAF_{NPL\_Trgt}$ or the target injection amount $Q_{NPR\_Trgt}$ at the time of the NOx purge control.

<Others>

The present invention is not limited to the above-described embodiment, and the invention may be modified appropriately without departing from the spirit and scope of the invention.

This application is based upon and claims the benefit of priority from Japanese Patent Application No. 2015-045609, filed Mar. 9, 2015, the entire contents of which are incorporated herein by reference.

INDUSTRIAL APPLICABILITY

The exhaust purification system and the catalyst regeneration method of the present invention can effectively prevent occurrence of white smoke and deterioration of fuel consumption by appropriately correcting an interval of NOx purification according to the amount of NOx occlusion when the catalyst is in an inactive state, and are useful in that the exhaust gas discharged from the internal combustion engine is effectively purified.

REFERENCE SIGNS LIST

10: engine
11: injector
12: intake passage
13: exhaust passage
16: intake throttle valve
24: EGR valve
31: oxidation catalyst
32: NOx occlusion reduction type catalyst
33: filter
34: exhaust pipe injection device
40: MAF sensor
45: NOx/lambda sensor
50: ECU

The invention claimed is:

1. An exhaust purification system comprising:
an NOx occlusion reduction type catalyst that is provided in an exhaust passage of an internal combustion engine to reduce and purify NOx in an exhaust gas; and
a controller configured to:
acquire a catalyst temperature of the NOx occlusion reduction type catalyst;
estimate an NOx occlusion amount of the NOx occlusion reduction type catalyst;
perform a catalyst regeneration process of bringing the exhaust gas into a rich state to recover NOx occlusion capacity of the NOx occlusion reduction type catalyst;
set a target interval from termination of the catalyst regeneration process to a start of a next catalyst regeneration process;
start the next catalyst regeneration process when the NOx occlusion amount being estimated is equal to or greater than a predetermined threshold and an elapsed time from the termination of the catalyst regeneration process reaches the target interval; and
correct the target interval to be longer based on the NOx occlusion amount being estimated when the catalyst temperature being acquired is lower than a predetermined catalyst activation temperature.

2. The exhaust purification system according to claim 1, wherein the controller is further configured to correct the target interval to be longer as a ratio of the NOx occlusion amount to the threshold being estimated becomes smaller when the catalyst temperature being acquired is lower than the predetermined catalyst activation temperature.

3. An exhaust purification system comprising:
an NOx occlusion reduction type catalyst that is disposed in an exhaust passage of an internal combustion engine to occlude and reduce a nitrogen compound contained in an exhaust gas discharged from the internal combustion engine; and
a controller that controls an air-fuel ratio of the exhaust gas discharged from the internal combustion engine,
wherein the controller operates to execute a series of process comprising:
a catalyst temperature acquiring process of acquiring a catalyst temperature of the NOx occlusion reduction type catalyst;
an occlusion amount estimating process of estimating an NOx occlusion amount of the NOx occlusion reduction type catalyst;
a catalyst regeneration process of bringing the exhaust gas into a rich state to recover NOx occlusion capacity of the NOx occlusion reduction type catalyst;
a target interval setting process of setting a target interval from the termination of the previous catalyst regeneration process to a start of a next catalyst regeneration process;
a catalyst regeneration start process of starting the next catalyst regeneration process when the NOx occlusion amount estimated by the occlusion amount estimating process is equal to or greater than a threshold and an elapsed time from the termination of the previous catalyst regeneration process reaches the target interval; and
a target interval correcting process of extending and correcting the target interval based on the NOx occlusion amount estimated by the NOx occlusion amount estimating process when the catalyst temperature acquired by the catalyst temperature acquiring process is lower than a catalyst activation temperature.

4. A catalyst regeneration method in an exhaust purification system including an NOx occlusion reduction type catalyst that is disposed in an exhaust passage of an internal combustion engine to occlude and reduce a nitrogen compound contained in an exhaust gas discharged from the internal combustion engine, the method comprising:
a catalyst temperature acquiring process of acquiring a catalyst temperature of the NOx occlusion reduction type catalyst;
an NOx occlusion amount estimating process of estimating an NOx occlusion amount of the NOx occlusion reduction type catalyst;
a catalyst regeneration process of bringing the exhaust gas into a rich state to recover NOx occlusion capacity of the NOx occlusion reduction type catalyst;
a target interval setting process of setting a target interval from the termination of the previous catalyst regeneration process to a start of a next catalyst regeneration process;
a catalyst regeneration start process of starting the next catalyst regeneration process when the NOx occlusion amount estimated by the NOx occlusion amount estimating process is equal to or greater than a threshold and an elapsed time from the termination of the previous catalyst regeneration process reaches the target interval; and
a target interval correcting process of extending and correcting the target interval based on the NOx occlusion amount estimated by the NOx occlusion amount estimating process when the catalyst temperature acquired by the catalyst temperature acquiring process is lower than a catalyst activation temperature.

* * * * *